Dec. 7, 1943.   M. A. WECKERLY   2,336,326
MATERIAL FLOW CONTROLLER
Filed March 29, 1940   2 Sheets-Sheet 1
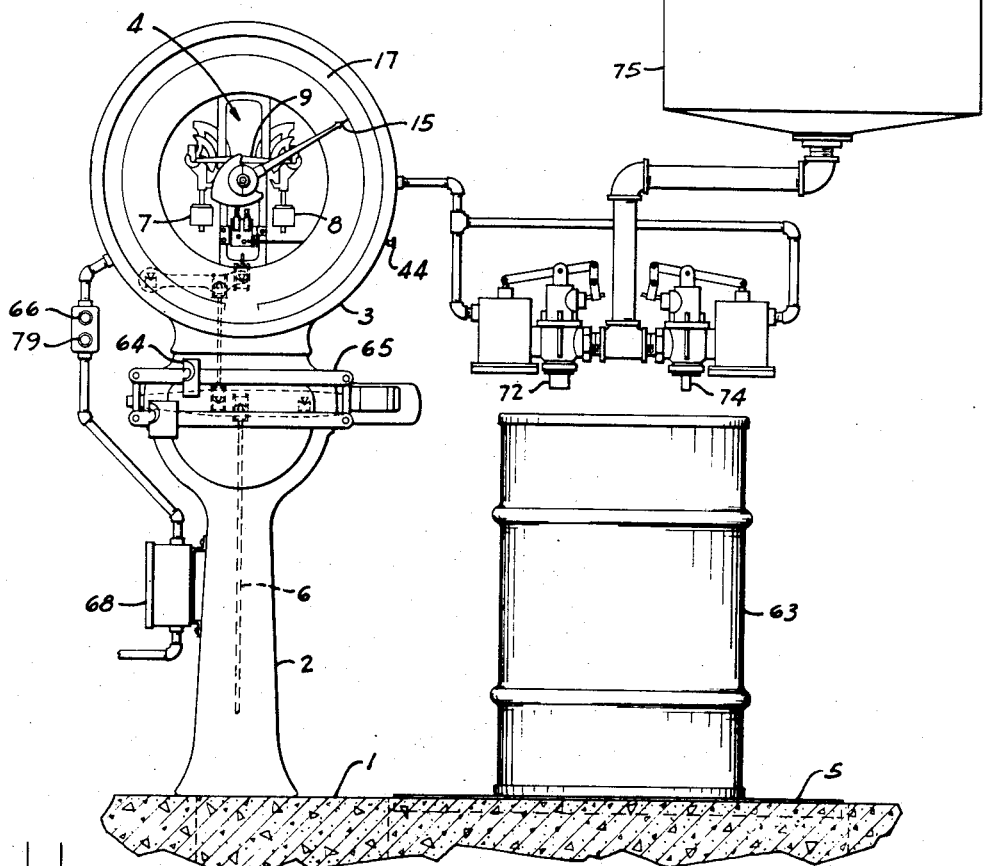
Fig. I
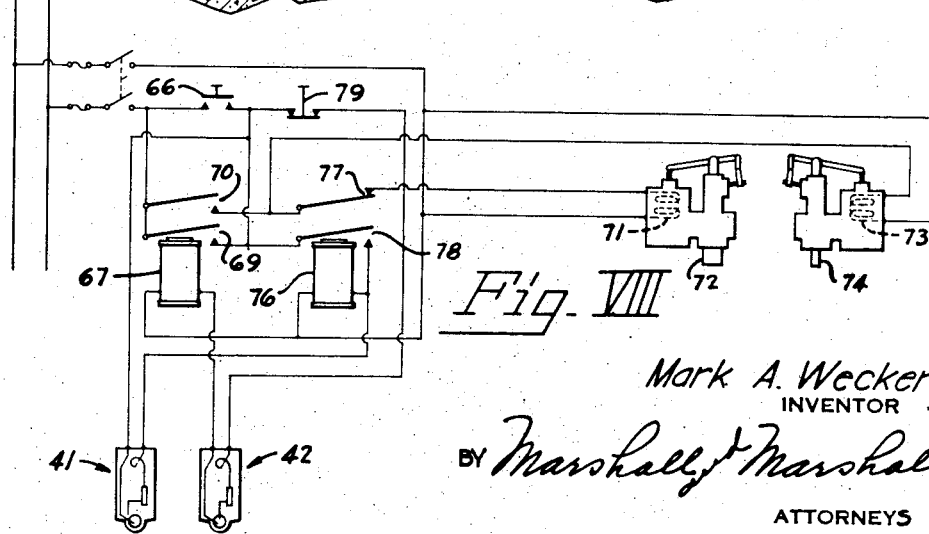
Fig. VIII
Mark A. Weckerly
INVENTOR
BY Marshall & Marshall
ATTORNEYS

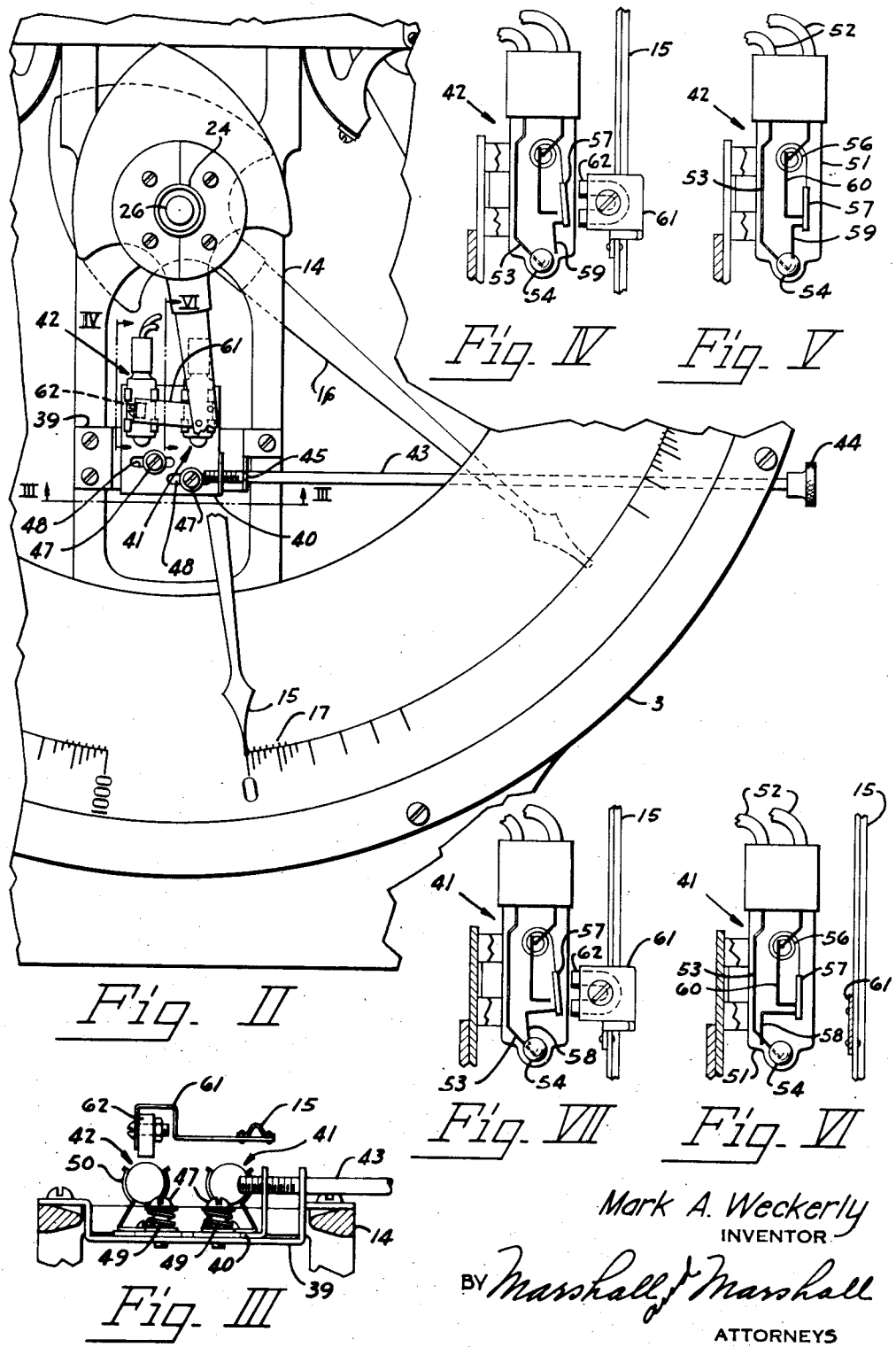

Patented Dec. 7, 1943

2,336,326

UNITED STATES PATENT OFFICE 2,336,326

MATERIAL FLOW CONTROLLER

Mark A. Weckerly, Toledo, Ohio, assignor to Toledo Scale Company, a corporation of New Jersey Application March 29, 1940, Serial No. 326,746

2 Claims. (Cl. 200—56)

This invention relates to material flow controllers, and particularly to material flow controllers for stopping the flow of materials when predetermined quantities thereof have been deposited upon weighing scale load-receivers.

An object of the invention is to provide an automatic weighing machine in which an electric switch is actuated by magnetic force which becomes effective when the automatic weighing machine is loaded exactly to a predetermined weight.

Another object is to provide an automatic weighing machine having a magnetically actuated switch which is operated when the load on the automatic weighing machine approaches a predetermined weight, and having a second magnetically actuated switch which is operated when the load on the automatic weighing machine reaches an exact predetermined weight.

A third and very important object of the invention is to provide an automatic weighing machine having a weight-responsive element which moves comparatively great distances for small increments of load and carries a light permanent magnet that operates a switch when, and only when, the light magnet is carried into close juxtaposition to the switch.

Another important object is to provide an automatic weighing machine having a light, highly weight-responsive element which carries a light permanent magnet successively into close juxtaposition to a plurality of sensitive, magnetically operable switches.

And still another important object is to provide a sub-combination, capable of incorporation in automatic weighing machines, which comprises a light weight-responsive element such as an indicator, a light permanent magnet carried by such element, and a sensitive switch located adjacent the path through which such magnet is carried by such element, the switch being operated when the magnet is carried into definite proximity thereto.

Other objects and advantages will be apparent from the following description, in which reference is had to the accompanying drawings illustrating a preferred embodiment of my invention and wherein similar reference numerals designate similar parts throughout the several views.

In the drawings:

Fig. I is a front elevational view of a weighing scale and material supply means incorporated with the material flow controller of my invention;

Fig. II is an enlarged fragmentary elevational view showing a part of the weighing scale indicating mechanism with circuit controllers incorporated therewith in accordance with my invention;

Fig. III is a fragmentary bottom plan view with parts in section, taken along the line III—III of Fig. II;

Fig. IV is a further enlarged fragmentary side elevational view showing a mercury switch and a magnetic switch actuating member employed in the mechanism illustrated in Figs. I and II, the switch being open;

Fig. V is a similar view of the switch closed;

Fig. VI is a similar enlarged fragmentary side elevational view showing another form of mercury switch employed in the mechanism, the switch being open;

Fig. VII is a similar view of the mercury switch illustrated in Fig. VI and a magnetic switch actuating member, the switch being closed;

Fig. VIII is a wiring diagram showing the circuits employed in the mechanism illustrated in Fig. I.

The invention is shown in the drawings as incorporated with a scale of the type illustrated and described in United States Patent No. 1,543,768, to Halvor O. Hem. Since the weighing mechanism per se is not of my invention, I have illustrated and will describe it only in such detail as will suffice to explain the connection of my invention therewith.

Erected on the base 1 is an upwardly extending column 2. The column 2 is surmounted by a substantially watchcase-shaped housing 3 in which load-counterbalancing mechanism 4 is suitably mounted. A load-receiving platform 5 rests upon platform levers (not shown) which are suitably located and supported within the base 1, the platform levers being operatively connected, by means of a rod 6, to the load-counterbalancing mechanism 4.

When a load is placed upon the platform 5, gravitational force, acting upon the load, is transmitted through the platform levers and rod 6 to the load-counterbalancing mechanism 4, which comprises pendulums 7 and 8 that swing outwardly and upwardly until their weight moment offsets the force of gravity acting upon the load. A compensating bar (not shown) is operatively connected to the pendulums 7 and 8 and through a rack drives an indicator shaft upon the opposite ends of which indicating hands 15 and 16 are secured. When the pendulums 7 and 8 move upwardly under the influence of an increased load on the scale, the indicating hand 15 swings in a clockwise direction over a cooperating chart 17. The hand 16 is similarly swung, but in a counterclockwise direction, over an oppositely facing chart (not shown) which is located at the opposite side of the housing 3. The movement of the automatic load-counterbalancing mechanism 4 being proportional to the weight of a load on the platform 5, the angle traversed by each of the indicator hands also is proportional to the weight of the load, and the indicator hands and charts therefore may be employed to indicate the weights of loads. In the scale incorporated with my invention the charts are provided with identical series of figures and graduations, the figures and graduations on each chart being disposed in counterclockwise sequence.

The indicating hand 15 is clutched to the shaft 12 in such manner than upon manual release of the clutch, the position of the hand 15 with reference to the indicia on the chart 17 may readily be changed. The clutching mechaniism is manually operable from the exterior of the housing 3 by means of a hub 24 which is fixed to the indicator 15 and rotatable relative to a button 26 secured on the end of the indicator shaft. The hub 24 and shaft on which the button 26 is fixed extend forwardly through an aperture (not shown) in the front glass of the housing 3.

Rigidly secured to the pendulum supporting frame 14 is a bracket 39 which may be formed of sheet metal, and a sheet metal frame 40, carrying mercury contact switches 41 and 42, is slidably engaged with the bracket 39 and adapted to be adjusted laterally thereon by means of a rod 43, one end of which is threaded into the frame 40, the other end projecting to the exterior of the housing 3 and being provided with a knurled knob 44. The inner end of the rod 43 is supported within an opening in the bracket 39, the rod 43 at the point of support being provided with a circumferential groove 45 whereby the rod 43 is held against longitudinal movement. Retaining screws 47 extend through elongated openings 48 in the frame 40 and are threaded into the bracket 39, and expansion springs compressed between the heads of the screws 47 and the frame 40 hold the frame and bracket together tightly enough to prevent displacement due to vibration.

Magnetically actuated mercury switches 41 and 42 are secured to the frame 40 by means of clips 50. Each of the magnetically actuated mercury switches 41 and 42 is housed within a glass vacuum bulb 51, from the top of which extend lead wires 52. Within each bulb 51 is a wire 53, the upper end of which is connected to one of the lead wires, the lower end being immersed in a globule of mercury 54 which lies in a small depression in the lower end of the bulb. Supported within the bulb 51 is a light spiral spring 56 from which is suspended a soft iron armature 57. The armature 57 of the mercury switch 41 carries a wire 58 which, in the normally open position of the switch (see Fig. VI), is out of contact with the globule of mercury. The spiral spring 56 exerts sufficient force on the armature 57 to hold it normally against a stop 60.

Riveted or otherwise secured to the indicator hand 15 is a bracket 61 of aluminum or other non-magnetic metal which carries a permanent magnet 62, preferably of the horseshoe type, the magnet being so located on the indicator hand 15 as to pass closely to the magnetic mercury contact switches 41 and 42 as the indicator hand 15 moves to zero position. When the magnet reaches a certain definite proximity to the armature 57 of the magnetically actuated mercury switch 41, the armature swings toward the magnet, thus causing the end of the wire 58 to touch the globule of mercury 54 and complete an electric circuit through the lead wires 52.

The magnetically actuated mercury switch 42 is normally closed (see Fig. V), the wire 59 which is carried by the armature of the switch 42 having its end normally immersed in the globule of mercury. As the magnet moves away from the armature 57, the switch 41 opens (see Fig. VII), and as the magnet approaches the armature 57 of the switch 42 it causes that switch to open also (see Fig. IV). Thus the circuits through the switches 41 and 42 are both open when the indicator hand 15 reaches zero position.

Assume that the device of my invention is incorporated with material feeding and weighing mechanism such as that illustrated in Fig. I and that the mechanism is to be employed to control the automatic filling of drums intended each to hold 300 pounds. The weight of the empty drum 63 first is counterbalanced by moving a poise 64 to a position on a beam 65 in which the indicator hand 16 registers with the zero graduation of its chart. Next the indicator hand 15 is unclutched from the indicator shaft and turned to a position in which its point registers with the 300-pound indicium on the chart 17, whereupon the hand 15 is re-clutched to the shaft. With the scale thus in condition to receive the load, the operator closes a manually operated push button switch 66, thus completing a circuit to a magnetic relay 67 which may be located in a box 68 fastened to the column 2 (see Figs. I and VIII). When the relay 67 is energized its contacts 69 close and the current is shunted around the manually operated switch 66, so that the circuit is not again broken when the operator permits the switch 66 to open. Energization of the relay 67 also closes contacts 70. Closing of the contacts 70 energizes a solenoid 71, which opens a fast feed valve 72. At the same time current through the contacts 70 passes through a branch circuit and energizes a solenoid 73, causing a dribble feed valve 74 to open. As liquid flows from a source of supply 75 into the drum 63, the pendulums 7 and 8 gradually swing upwardly, the indicator hand 16 moves away from zero and the indicator hand 15 moves toward zero, carrying the permanent magnet 62 toward the mercury switch 41. When in its approach toward zero the indicator hand 15 reaches a definite position with the magnet 62 before the switch 41, the armature 57 of the switch 41 flips toward the magnet, thus closing the circuit through the switch 41. Closing of the circuit through the switch 41 energizes a magnetic relay 76, opening contacts 77 and breaking the circuit supplying the solenoid 71, thus causing the fast feed valve 72 to close. The initial energization of the relay 76 also closes contacts 78, thus maintaining current in the relay. The dribble feed valve 74 remains open and liquid continues to dribble into the drum 63 and the indicator hand 15 moves slowly until it is in precise registration with the zero graduation of the chart 17, at which point the magnet 62 is just sufficiently close to the armature 57 of the magnetically actuated mercury switch 42 to attract the armature and open the switch. Opening of the switch 42 breaks the circuit supplying the magnetic relay 67, de-energizing the solenoid 73 and causing the dribble feed valve to close, and also de-energizing the relay 76, thereby restoring the electric system to the condition in which it was before the manually operable switch 66 was closed. With the system thus restored to its initial condition, the drum 63 may be removed, another container placed upon the scale, and the operation of filling repeated.

As it sometimes is necessary in an emergency to stop the feed of material, for example when a defective drum has been placed upon the platform, a manually operable circuit opening push button switch 79 has been provided for resetting the electrical system to its initial condition.

During a weighing operation the indicator hand 16 swings away from the zero mark on its chart, and when the weighing has been completed, the indicator hand 16 indicates on its chart the exact weight of the material that has been placed in the container. If it should appear that less than the required weight has been placed in the container, the mercury switches may be shifted to the left by turning the knob 44. If it appears that more than the required weight has been placed in the container, the mercury switches may be shifted to the right. Thus, the apparatus may be adjusted to cause the flow of material to be stopped when exactly the required weight has been fed through the valves.

The embodiment of my invention herein shown and described is to be regarded as illustrative only, and it is to be understood that the invention is susceptible to variation, modification and change within the spirit and scope of the subjoined claims.

Having described my invention, I claim:

1. In a condition controlling instrument, in combination, a switch for controlling such condition, said switch having a movable contact and a magnetically attractable armature mounted thereon, a condition indicator responsive to changes in the condition under control, condition responsive mechanism for operating said indicator, and a magnet attached to said indicator, said switch being mounted adjacent the path of movement of said indicator at such distance therefrom as to enter and be operated by the appreciable force field of said magnet only when said magnet and said switch are on a line substantially at right angles to the plane of movement of said indicator, said indicator being adjustable relative to said condition responsive mechanism for varying the state of the condition under control at which said magnet operates said switch.

2. In a material flow controlling device, in combination, material quantity responsive mechanism, a material quantity indicator operated by said mechanism and adjustable relative to said mechanism to vary the quantity of material required to move said indicator to a position showing the flow of a selected quantity of material, a magnet mounted on said indicator and a magnetically operable switch mounted adjacent the plane of movement of said indicator at such a point and such a distance from said plane that said switch enters and is operated by the appreciable force field of said magnet only when said indicator reaches a position showing the flow of such selected quantity of material, a line from said switch to said magnet then being substantially at right angles to the plane of movement of said indicator.

MARK A. WECKERLY.